United States Patent
Mundy

(10) Patent No.: US 9,801,459 B2
(45) Date of Patent: Oct. 31, 2017

(54) DUMBBELL CARRIER

(71) Applicant: Michael Joseph Mundy, Tampa, FL (US)

(72) Inventor: Michael Joseph Mundy, Tampa, FL (US)

( * ) Notice: Subject to any disclaimer, the term of this patent is extended or adjusted under 35 U.S.C. 154(b) by 0 days.

(21) Appl. No.: 15/278,280

(22) Filed: Sep. 28, 2016

(65) Prior Publication Data

US 2017/0127814 A1 May 11, 2017

Related U.S. Application Data

(60) Provisional application No. 62/254,042, filed on Nov. 11, 2015.

(51) Int. Cl.
*A45F 5/10* (2006.01)
*B65G 7/12* (2006.01)
*A63B 71/00* (2006.01)

(52) U.S. Cl.
CPC .............. *A45F 5/1026* (2013.01); *A45F 5/10* (2013.01); *A63B 71/0036* (2013.01); *B65G 7/12* (2013.01); *A45F 2005/1093* (2013.01)

(58) Field of Classification Search
CPC .......... A45F 5/10; A45F 5/102; A45F 5/1026; A45F 2005/1006; A45F 2005/1093; A45F 2200/0566; A63B 71/0036; B65G 7/12
USPC ................... 294/15, 137, 145, 165; 211/85.7
See application file for complete search history.

(56) References Cited

U.S. PATENT DOCUMENTS

| | | | | |
|---|---|---|---|---|
| 1,308,031 A | * | 7/1919 | Bell ........................... | A47F 5/01 211/49.1 |
| 1,865,645 A | * | 7/1932 | Schroder .............. | B65D 23/104 206/446 |
| 2,049,219 A | * | 7/1936 | Muschinske ......... | B65D 23/106 16/425 |
| 2,063,805 A | * | 12/1936 | Goetting ................. | A47J 45/10 294/164 |
| 2,430,142 A | * | 11/1947 | Roberts ...................... | A45F 5/10 294/15 |
| 3,036,750 A | * | 5/1962 | Lombardi ................. | A45F 5/10 211/181.1 |
| 3,318,453 A | * | 5/1967 | Cavanagh ............... | B42F 17/08 211/11 |
| 4,759,578 A | * | 7/1988 | Gonzalez ................. | B65G 7/12 294/137 |
| 5,630,776 A | * | 5/1997 | Yang ................... | A63B 71/0036 211/198 |
| 6,045,019 A | * | 4/2000 | Moses ....................... | A45F 3/14 224/257 |
| 6,321,910 B1 | * | 11/2001 | Bates ..................... | B65D 67/02 206/449 |

(Continued)

*Primary Examiner* — Dean J Kramer
(74) *Attorney, Agent, or Firm* — Dunlap Bennett & Ludwig PLLC

(57) ABSTRACT

A dumbbell sling for transporting a plurality of dumbbells with one hand is provided. The dumbbell sling may provide spaced apart rails. Each rail extends from a top end to a bottom end, wherein each top end provides a handle, and wherein each bottom end provides a pair of elbows interconnecting the opposing bottom ends. The rails may be dimensioned apart to accommodate the handle of dumbbells for sliding there between so to be stacked on the pair of elbows, whereby the use may tote a plurality of dumbbells with a single hand manipulating the top end handles.

5 Claims, 2 Drawing Sheets

(56) References Cited

U.S. PATENT DOCUMENTS

| | | | | |
|---|---|---|---|---|
| 6,857,673 B2 * | 2/2005 | Lang | ................... | B65G 7/12 |
| | | | | 294/142 |
| 7,134,548 B2 * | 11/2006 | Meehan | ................ | A45C 11/00 |
| | | | | 206/315.1 |
| 7,270,358 B2 * | 9/2007 | Hirsch | ..................... | A45F 3/14 |
| | | | | 294/148 |

* cited by examiner

DUMBBELL CARRIER

CROSS-REFERENCE TO RELATED APPLICATION

This application claims the benefit of priority of U.S. provisional application No. 62/254,042, filed 11 Nov. 2015, the contents of which are herein incorporated by reference.

BACKGROUND OF THE INVENTION

The present invention relates to exercise and gym equipment and, more particularly, to a dumbbell carrier enabling users to safely transport a plurality of dumbbells with one hand and so allowing the user to carry other items with the other hand.

Attempting to carry multiple handheld-dumbbells in one hand is a hazard that could lead to serious injury. As a result, since people have only two hands, they can safely move only two dumbbells at one time. In a gym setting, the free weights are typically allocated to weight room or certain section of the gym. In commercial gyms, these weight rooms/sections can be large to accommodate scores of users. Because dumbbell weights tend to be moved all around throughout such weight rooms/sections during the course of the day, retrieval of such moved dumbbell weights at the end of the day can be a lengthy process, when done safely two at a time.

As can be seen, there is a need for a dumbbell carrier enabling users to safely transport a plurality of dumbbells with one hand and so allowing the user to carry other items with the other hand.

SUMMARY OF THE INVENTION

In one aspect of the present invention, a dumbbell carrier includes two spaced apart rails, wherein each rail extends from a top end to a bottom end; each rail formed by a continuous bar extending from a first bottom end to define a U-turn at the top end so as to extend back to a second bottom end; and two elbows, each elbow joining the first bottom ends and, respectively, the second bottom ends.

In another aspect of the present invention, the dumbbell carrier includes two spaced apart rails, wherein each rail extends from a top end to a bottom end; and the two spaced apart rails formed by a continuous bar extending along a first bottom end of each of the two spaced apart rails so as to define a U-turn at the top end so as to extend back to a second bottom end thereof, and defining two continuous elbows, each continuous joining the first bottom ends and, respectively, the second bottom ends, and wherein the two continuous elbows are orthogonally oriented relative to the U-turns.

In yet another aspect of the present invention, the dumbbell carrier includes two spaced apart rails, wherein each rail extends from a top end to a bottom end; the two spaced apart rails formed by a continuous bar extending along a first bottom end of each of the two spaced apart rails so as to define a U-turn at the top end so as to extend back to a second bottom end thereof, and defining two continuous elbows, each continuous joining the first bottom ends and, respectively, the second bottom ends, and wherein the two continuous elbows are orthogonally oriented relative to the U-turns; a tubular grip housing each U-turn; a distance separating the two spaced apart rails is dimensioned to slidably receive a handle of a dumbbell, and wherein a distance between the bottom end and the top end is dimensioned to support a plurality of the dumbbells in a stacked configuration; and a band extending along one of the two spaced apart rails, wherein the band provides a printable area.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a dumbbell sling for transporting a plurality of dumbbells with one hand. The dumbbell sling may provide spaced apart rails. Each rail extends from a top end to a bottom end, wherein each top end provides a handle, and wherein each bottom end provides a pair of elbows interconnecting the opposing bottom ends. The rails may be dimensioned apart to accommodate the handle of dumbbells for sliding there between so to be stacked on the pair of elbows, whereby the use may tote a plurality of dumbbells with a single hand manipulating the top end handles.

Figure 1:
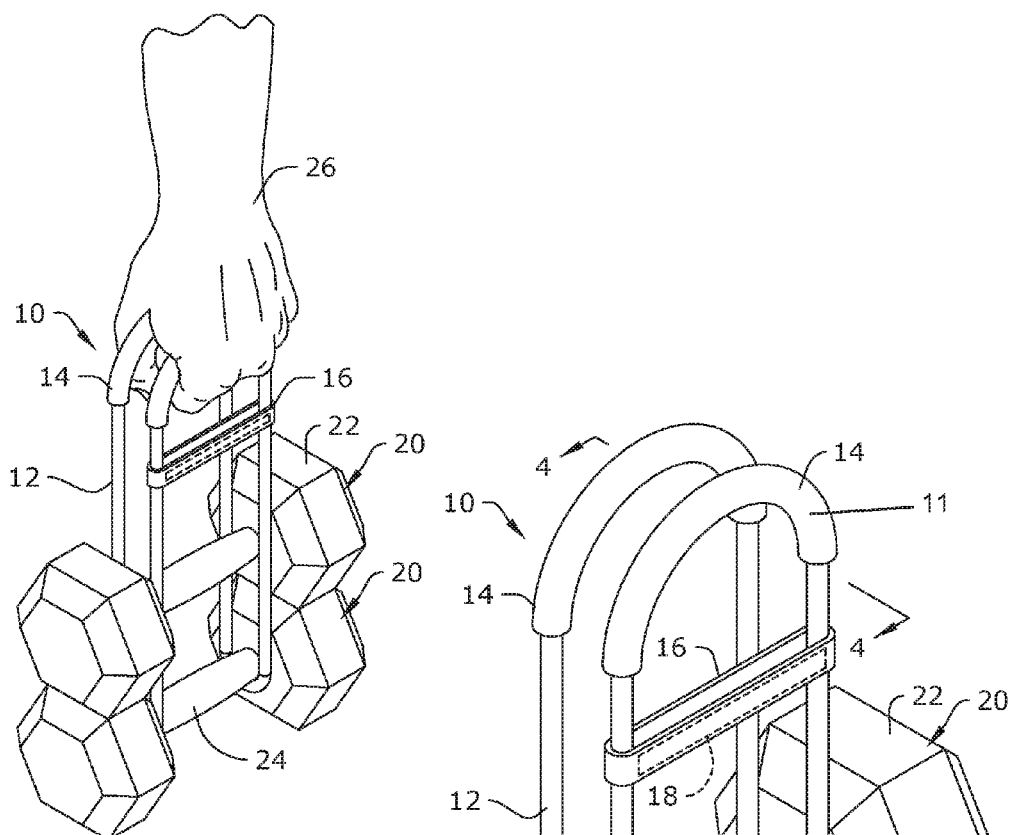
FIG. 1 is a perspective view of an exemplary embodiment of the present invention, shown in use.
Figure 2:
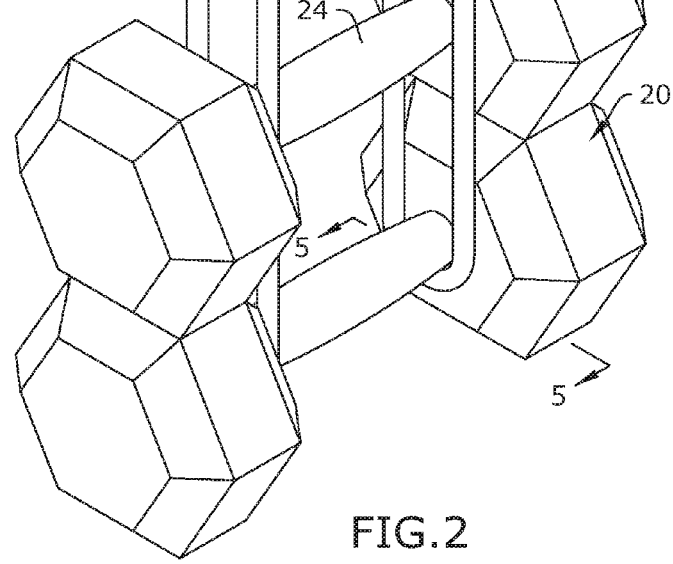
FIG. 2 is a perspective view of an exemplary embodiment of the present invention, shown in use.
Figure 3:
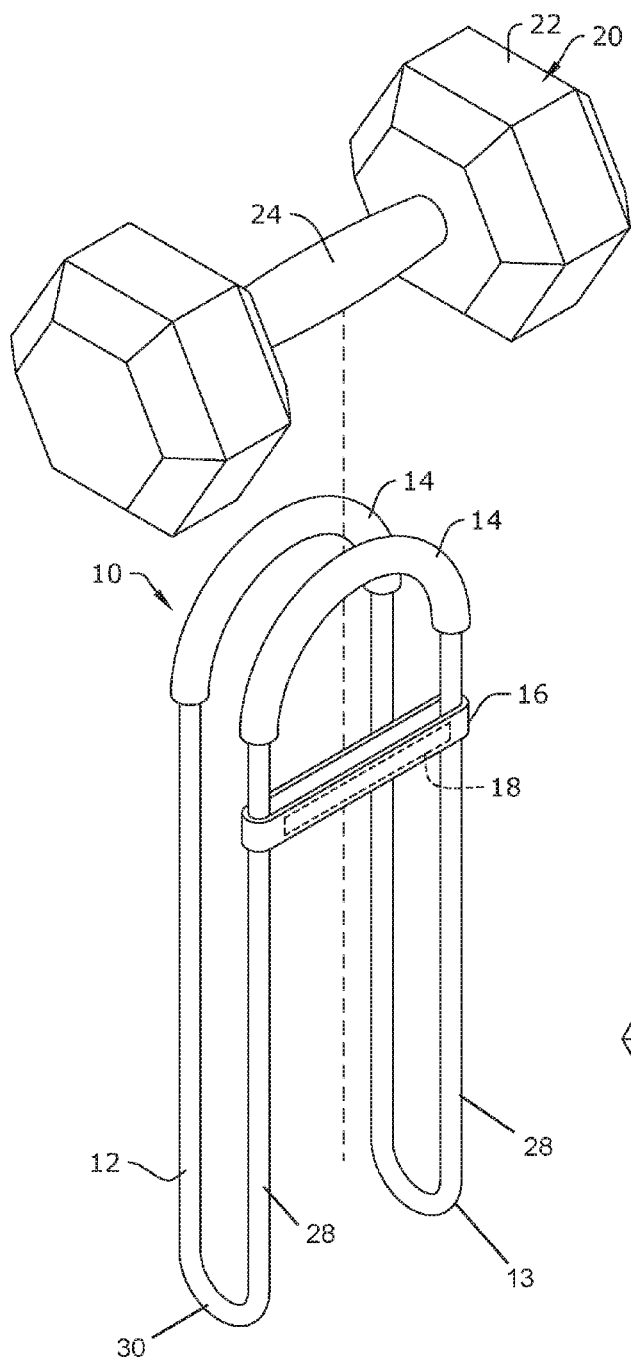
FIG. 3 is an exploded view of an exemplary embodiment of the present invention, demonstrating use.

Referring to FIGS. 1 through 5, the present invention may include a dumbbell sling 10. The dumbbell sling 10 may include two spaced apart rails 12, each rail 12 extending from a top end 11 to a bottom end 13. A length that each rail 12 extends may vary depending on need, but in certain embodiments the length may range from one foot to four feet. Each rail 12 may be formed from a bar 28 or two spaced apart bars 28 of a material that can be repeatedly bent without fracturing, yet carry the tension and compression load so as to function in accordance with the present invention as described herein. Such material may be various metallic materials, various impregnated or laminated fibrous materials, various plasticized materials and the like, for example ¼-inch stainless steel bars 28. The bars 28 lighted the weight of the present invention, which will be weighted by the carrying dumbbells 20. In certain embodiments, each rail 12 may be defined by a unitary bar that extends from the bottom end 13 to the top end 11 and thereat U-turns back toward the bottom end 13 forming a continuous loop. In such an embodiment, the two spaced apart rails may be connected by a pair of separate elbows 30. In some embodiments, both spaced apart rails 12 may be formed from one continuous looped bar 28, wherein the immediately-above described unitary bar 28 continues to form at another bottom end 13 a U-turn at an angle approximately orthogonal to its top end 11 U-turn, thereby to continuously defining a continuous elbow 30 and the other opposing spaced apart rail 12 and elbow 30 in a similar manner, as illustrated in FIG. 3. In either embodiments, because of the material of the unitary bar 28 or the material of the separate elbows 30, the spaced apart rails 12 bend toward each other by pivoting about the bottom end 13 and/or elbows 30. It should be understood that, in different embodiments, the rails 12 and thus the elbows 30 may not define loops but rather may be a continuous bent sheet of material with handles provided near the top ends 11.

Figure 4:
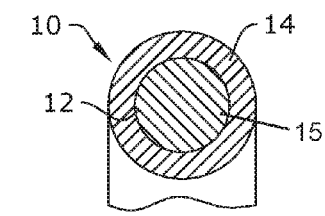
FIG. 4 is a section view of an exemplary embodiment of the present invention, taken along line 4-4 of FIG. 2.

Accordingly, a handle 15 may be formed by each U-turning bar 28 at each top end 11 (or provided thereat by each spaced apart bars 28 in certain embodiments) so that a user 26 gripping both spaced apart handles 15 may urge them, and thus the top ends 11 of the rails 12, toward each other. The dumbbell sling 10 may provide grips 14 along the periphery of the handles 15, as illustrated in FIGS. 2 and 4. The grips 14 may be made of rubber or equivalent non-slip material. In certain embodiments, a band 16 may extend between two opposing bars 28 or bar segments along at least one rail 12, as illustrated in FIGS. 1 and 2. Each band 16 may provide a printable area 18 affording a surface area for applying printing, graphic printing and the like so as to convey a message, instructions, or the like.

The two opposing rails 12 may be spaced apart a distance so as to accommodate a dumbbell handle 24 of a dumbbell 20 there between.

Figure 5:
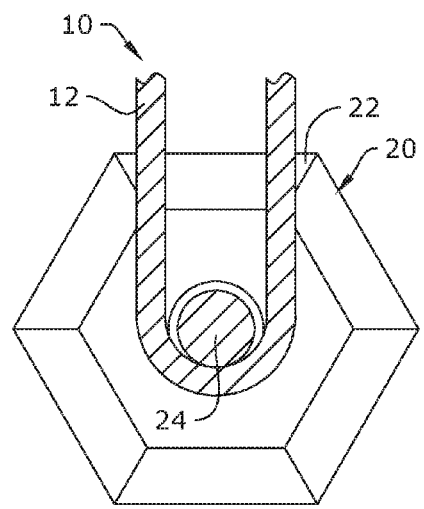
FIG. 5 is a section view of an exemplary embodiment of the present invention, taken along line 5-5 of FIG. 2.

A method of using the present invention may include the following. The dumbbell sling 10 disclosed above may be provided. The user 26 may slide at least one dumbbell 20 between the two spaced apart rails 12 from the top end 11 to the bottom end 13 so that the at least one dumbbell 20 is supported at the elbows 30 joining the two rails 12, as illustrated in FIG. 5, or on another dumbbell 20 thereon. When loading said dumbbells 20, their weighted heads 22 extend beyond a periphery of the rails 12, as illustrated in FIGS. 1-3.

The loaded condition of the dumbbells 20 forms a stacked orientation when more than one dumbbell 20 is in the loaded condition, as illustrated in FIGS. 1 and 2. Again, the user 26 may urge the opposing rails 12 together by manipulating the handles 15, so as the further secure the dumbbells in the loaded condition during transport or storage.

It should be understood, of course, that the foregoing relates to exemplary embodiments of the invention and that modifications may be made without departing from the spirit and scope of the invention as set forth in the following claims.

What is claimed is:

1. A device, comprising:
   two spaced apart rails, wherein each rail extends from a top end to a bottom end, wherein the two rails are spaced apart a uniform distance adapted so that both top ends are graspable simultaneously by a single human hand;
   each rail formed by a continuous bar extending from a first bottom end to define a U-turn at the top end so as to extend back to a second bottom end;
   two elbows of rigid material, each elbow joining the first bottom ends and, respectively, the second bottom ends, and wherein each elbow is defined by a continuous, uniform curvature; and
   a band extending along one of the two spaced apart rails.

2. The device of claim 1, wherein the two elbows and the two spaced apart rails are formed from one continuous bar.

3. The device of claim 1, further comprising a tubular grip housing each U-turn.

4. The device of claim 1, wherein the band provides a printable area.

5. The device of claim 4, wherein the printable area provides instruction for using the device.

* * * * *